United States Patent Office 3,700,560
Patented Oct. 24, 1972

3,700,560
ENZYMATIC PRODUCTION OF CATECHOL
FROM PHENOL
Robert A. Oppermann, 9104 Lynwood Drive,
Oak Lawn, Ill. 60453
No Drawing. Filed Oct. 23, 1970, Ser. No. 83,170
Int. Cl. C12d 13/00
U.S. Cl. 195—49                                    4 Claims

ABSTRACT OF THE DISCLOSURE

In the enzymatic production of catechol from phenol utilizing tyrosinase, the monophenolase activity is favored by utilizing crude Neurospora enzyme directly or in combination with mushroom tyrosinase together with a catechol trapping metal salt selected from barium, lead, copper, aluminum and ferric ammonium citrate adjusted to a pH of about 5.8. Optional additives include anionic buffers and mild reducing agents such as cysteine and sodium ascorbate.

The present invention relates generally to the production of catechol which is alternatively known in the art as pyrocatechol, 1,2-benzenediol, o-dihydroxybenzene and pyrocatechin. Catechol is a water-soluble crystalline compound with a phenolic odor and taste useful in the preparation of dyes and medicinals, antioxidants for rubber, lubricating oils, etc., and which commands a substantial value per pound in the commercial chemical marketplace.

The complete sequence proceeding from benzene or alternately toluene by oxidation yields first phenol, then catechol and finally benzoquinone. The present invention is directed specifically towards the step which utilizes phenol as a starting material and by specific enzymatic reaction produces catechol to the exclusion of further oxidation.

The present invention utilizes specific varieties of the enzyme tyrosinase weighted to suppress the catecholase activity and to promote the monophenolase activity to produce the desired catechol product. Specifically, the Neurospora enzyme is preferred, and it has also been found that this enzyme serves to damp unwanted dihydric activity in the phenolase of the common mushroom. Additionally, it has been found that the addition of certain metal salts, preferably aluminum, in concentrations designed to tie up the catechol from further oxidation assist in the process. Such metal salts are exemplified by the use of barium, lead, and copper cations, as well as ferric ammonium citrate, utilized at a slightly acid pH of about 5.8.

Exemplary salts include the halides of the above metal salts such as barium chloride and aluminum chloride.

PRIOR ART

The chemical production of catechol and its history are covered in the Encyclopedia of Chemical Technology, II, 11, 462, and the history of tyrosinase and its variations is found in the following:

(1) Tyrosinase, J. M. Nelson and C. R. Dawson, Advan. Enzymology, 4, 99, 1944.
(2) Copper Oxidases, C. R. Dawson and W. P. Tarpley in J. B. Sumner and K. Myrbäck "The Enzymes," vol. 2, Academic Press, 1951, pages 454 through 498.
(3) Chemistry and Methods of Enzymes by J. B. Sumner and G. F. Somers, Academic Press, 1953, pages 240–248.
(4) Separation and Purification of the Phenolases of the Common Mushroom, J. L. Smith and R. C. Krueger, J. Biol. Chem. 237, page 1121 (1962).
(5) The Isolation and Properties of Crystalline Tyrosinase from Neurospora, M. Fling, N. H. Horowitz and S. Heinemann, J. Biol. Chem. 238, page 2045 (1963).
(6) Purification of Phenol Oxidases, D. S. Bendall and R. P. F. Gregory, in Enzyme Chemistry of Phenolic Compounds, J. B. Pridham, ed., Pergamon, N.Y., page 7, (1963).

The enzymatic function

Tyrosinase is known to be an aerobic oxidase or alternatively stated it operates in the presence of gaseous oxygen which catalyzes the oxidation of phenol to catechol. It is further known that tyrosinase is a copper-containing enzyme and of the oxidation-type enzymes it uniquely has dual activity. These activities are the phenolase (cresolase) activity pertinent to the present invention and a catecholase activity (polyphenolase) which is a competing or side reaction to the present invention and leads to the production of hydroquinone instead of the desired catechol production.

The purpose of the present invention is to select parameters for the process which will suppress the dihydric activity in favor of the activity promoting the oxidation of hydroxylation of phenol to catechol. Of the available sources of tyrosinase, potato peels and the common mushroom have been utilized as raw material. However, experimental data showed that in utilizing potato and mushroom tyrosinase, the production results were disappointing. Contrastingly, the tyrosinase from Neurospora which has been isolated and purified by the method of Fling et al., ante, gave results favoring catechol production. Experiments were made both with the purified enzyme and the fresh enzyme and the results indicated, as has been theorized, that purification destroyed the monophenolase activity, and this agrees with the conclusions reached by J. M. Nelson and C. R. Dawson at pages 123, 149, ante.

A recovery rate of about 30% catechol production from phenol was exhibited by crude Neurospora tyrosinase utilizing input phenol concentrations of from about 0.01 to 0.1%. It was further observed that the activity of the purified enzyme reached maximum at about one-half hour while the crude enzyme reached a maximum activity at three-plus hours, as shown in Chart I below. Additional experiments with the crude tyrosinase from Neurospora showed that where it was added in a mixture to mushroom tyrosinase it served to suppress the catecholase of the latter.

CHART I.—CATECHOL PRODUCTION BY A NEUROSPORA ENZYME

[Conditions: One ml. of enzyme preparation was added to 100 ml. of .01% phenol in phosphate buffer, pH 7.5, at room temperature.]

| Time, hours: | Crude enzyme catechol O.D. | Purified enzyme catechol O.D. |
|---|---|---|
| 0 | 100 | 100 |
| .5 |  | 85 |
| 1.0 | 96.5 |  |
| 1.5 |  | 85 |
| 2.0 | 94.5 |  |
| 2.5 |  | 77 |
| 3.0 | 92.2 |  |
| 3.5 |  | 89 |
| 4.0 | 85.5 |  |
| 4.5 |  | 89 |
| 5.0 | 65.0 |  |
| 6.0 | 70.5 |  |

Additionally, this invention contemplates the addition of metal salts to stabilize the catechol, it being known that metal salts form complexes with catechol and it is theorized that the addition of these salts serves to trap the catechol and remove it from the site of the oxidation reaction. The addition of metal salts was made in weight percentages ranging from 0.01 to 0.05, and although various soluble anions are operable, the halides and ammonium complexes of simple carboxylic and hydroxy carboxylic acids such as acetate and citrate may be utilized. Most preferably are the chlorides, and specifically aluminum chloride and ferric ammonium citrate.

It is noted that Nelson and Dawson, ante, page 106, describe reactivating enzyme activity to divalent metals but the utilization and function leads away from the present development. In Chart II below are noted results from the optimum metal additives:

CHART II.—EFFECT OF METALS ON ENZYMATIC CATECHOL PRODUCTION IN SOLUTION

[Conditions: The salts were made up in solutions twice as concentrated as listed and then diluted one-half with .02% phenol solution (50 ml. of each). Two milligrams of mushroom tyrosinase were mixed into 100 ml. of .01% phenol. The solution was stirred continuously during the reaction. Samples were 10 ml. each.]

| | $AlCl_3$ .03% pH 5.8 | $Fe(NH_4)$ citrate .02% |
|---|---|---|
| Time, hours: | | |
| 0 | 100 | 100 |
| 1 | 93 | 73 |
| 2 | 80 | 49 |
| 3 | 72 | 50 |
| 4 | 65 | 59 |
| 5 | 57 | 67 |
| 6 | 63 | 55 |
| Summary of TLC results: | | |
| Phenol, p.p.m.* | 20 | 20 |
| Catechol, p.p.m.* | 20 | 30 |

*Approximately based on amount of color shown.

catechol solutions of known strength and the presence of phenol and other dihydroxyphenols was screened out. Additionally, the solutions were analyzed using a thin layer chromatography (TLC) and both phenol and catechol were determined.

ENZYMES

Mushroom tyrosinase was obtained from Nutritional Bio-Chemicals Company and was purified, salt free, containing an activity of 500 units per milligram. The isolation and purification of the other enzymes was in accordance with the teachings of Enzyme Chemistry of Phenolic Compounds, J. B. Pridham, editor, ante, and Fling et al., ante.

BUFFERS

The buffers used for the catechol production were all adjusted to a pH of 5.7–5.8 and were made as follows:

The acetate buffer consisted of 0.2 M acetic acid and .2 M sodium acetate and the pH was adjusted with sodium hydroxide. The phosphate buffer consisted of .2 M sodium hydroxide and .2 M monobasic potassium phosphate and the pH was adjusted with phosphoric acid. The borate buffer was made with .2 M boric acid and .2 M potassium chloride and the pH was adjusted with hydrochloric acid. The citrate buffer used .2 M sodium hydroxide plus .1 M citric acid and the pH was adjusted with sodium hydroxide.

The utilization of multiple anion buffers in the solution proved helpful, and additionally, two mild reducing agents, namely sodium ascorbate and cysteine were utilized. Chart III set out below gives the results which indicate that the best results were obtained with ferric aluminum citrate, citrate buffer and sodium ascorbate, lead acetate in citrate buffer with ascorbate, and aluminum chloride in citrate buffer and sodium ascorbate.

CHART III.—THE EFFECT OF BUFFERS AND METALS ON THE ENZYMATIC PRODUCTION OF CATECHOL IN SOLUTION
[Conditions: Concentrations of salts and other parameters are listed on Chart II. The sodium ascorbate used was 1 ml. of a 19.7% solution and the cysteine was 1 ml. of a 12.1% solution.]

| | $BaCl_2$ | | | | Ferric ammon. citrate | | | $Pb(C_2H_3O_2)_2$ | | $AlCl_3$ |
|---|---|---|---|---|---|---|---|---|---|---|
| | Borate, O.D. | Borate, ascorbate, O.D. | Citrate, O.D. | Phosphate, O.D. | Citrate, ascorbate, O.D. | Phosphate, ascorbate, O.D. | Phosphate, Tween 80, O.D. | Borate, ascorbate, O.D. | Citrate, ascorbate, O.D. | Citrate, ascorbate, O.D. |
| Time, hours: | | | | | | | | | | |
| 0 | 100 | 100 | 100 | 100 | 100 | 100 | 100 | 100 | 100 | 100 |
| 0.5 | 100 | | | 100 | 92 | | | | | |
| 1.0 | | 81 | | | 74 | 85 | 98 | 92 | 80 | 82 |
| 1.5 | 98 | 81 | *85 | 86 | | | | | | |
| 2.0 | | 77 | | | 64 | 85 | *95 | 84 | 78 | 71 |
| 2.5 | 96 | 73 | | 92 | 70 | 85 | 92 | 80 | 79 | 80 |
| 3.0 | 92 | 78 | 92 | 92 | 58 | 85 | 86 | 71 | 67 | 64 |
| 3.5 | 48 | 83 | 96 | 94 | 69 | 84 | 81 | 90 | 75 | 74 |
| 4.0 | 75 | 74 | 99 | 94 | 64 | 87 | 81 | 82 | 76 | 61 |
| 4.5 | | | 99 | 94 | 80 | 80 | 70 | 71 | 66 | 78 |
| 5.0 | | | 93 | | 81 | | | | | |
| 5.5 | | | | | | | | | | |
| Summary of TLC analysis: | | | | | | | | | | |
| Phenol p.p.m.+ | 80 | 30 | 0 | 0 | 30 | 20 | 20 | 30 | 30 | 30 |
| Catechol p.p.m.+ | ± | 30 | 20 | 20 | 30 | 20 | 20 | 30 | 30 | 30 |

*Start of production of colored compounds.
+Approximately, based on amount of color shown.
±Color, but not possible to estimate amount.

pH adjustment

It has been suggested in the art by Sumner and Myrbäck ante, page 469, that a pH range of 6 to 7 was optimum for the tyrosinase oxidation of p-cresol. The present invention utilizes a pH of about 5.8 for the production of catechol from phenol and contemplates an aqueous medium at room temperatures.

LABORATORY TECHNIQUES

Materials and methods

THE DETERMINATION OF CATECHOL

The quantitative colorimetric determination of ortho dihydroxyphenol (catechol) was made using the method of H. H. Willard and A. L. Wooten, Analytical Chemistry, 22, 670, 1950, which uses iodination in the presence of resorcinol to produce a dark grape blue color which is measured at 725µ. A standardization curve was made using

I claim:

1. The process of producing catechol by treating phenol with Neurospora monophenolase for a period of about 1–6 hours in aqueous solution at room temperature and in the presence of a metallic salt trapping agent containing cations selected from barium, lead, copper, aluminum and ferric iron adjusted to a pH of about 5.8 utilizing a buffer selected from the group consisting of
   (a) an acetate buffer consisting of acetic acid, sodium acetate, and sodium hydroxide;
   (b) a phosphate buffer consisting of monobasic potassium phosphate, phosphoric acid, and sodium hydroxide;
   (c) a borate buffer consisting of boric acid, potassium chloride, and hydrochloric acid; and
   (d) a citrate buffer consisting of citric acid and sodium hydroxide and a mild reducing agent selected from the group consisting of sodium ascorbate and cysteine.

2. The method according to claim 1 wherein ferric ammonium citrate, a citrate buffer and sodium ascorbate are used as the reaction solution.

3. The method according to claim 1 wherein lead acetate, citrate buffer and sodium ascorbate are used as the reactant solution.

4. The method according to claim 1 wherein aluminum chloride, citrate buffer and sodium ascorbate are used as the reactant solution.

References Cited

"Tyrosinase," Nelson et al., Advan. Enzymology, 4, pp. 99–149, 1944.

"The Isolation and Properties of Crystalline Tyrosinase From Neurospora," Fling et al. J. Biol. Chem., 238, pp. 2045–2053, 1963.

"Enzymes," Dixon, Academic Press, New York, p. 307, 1964.

JOSEPH M. GOLIAN, Primary Examiner